UNITED STATES PATENT OFFICE.

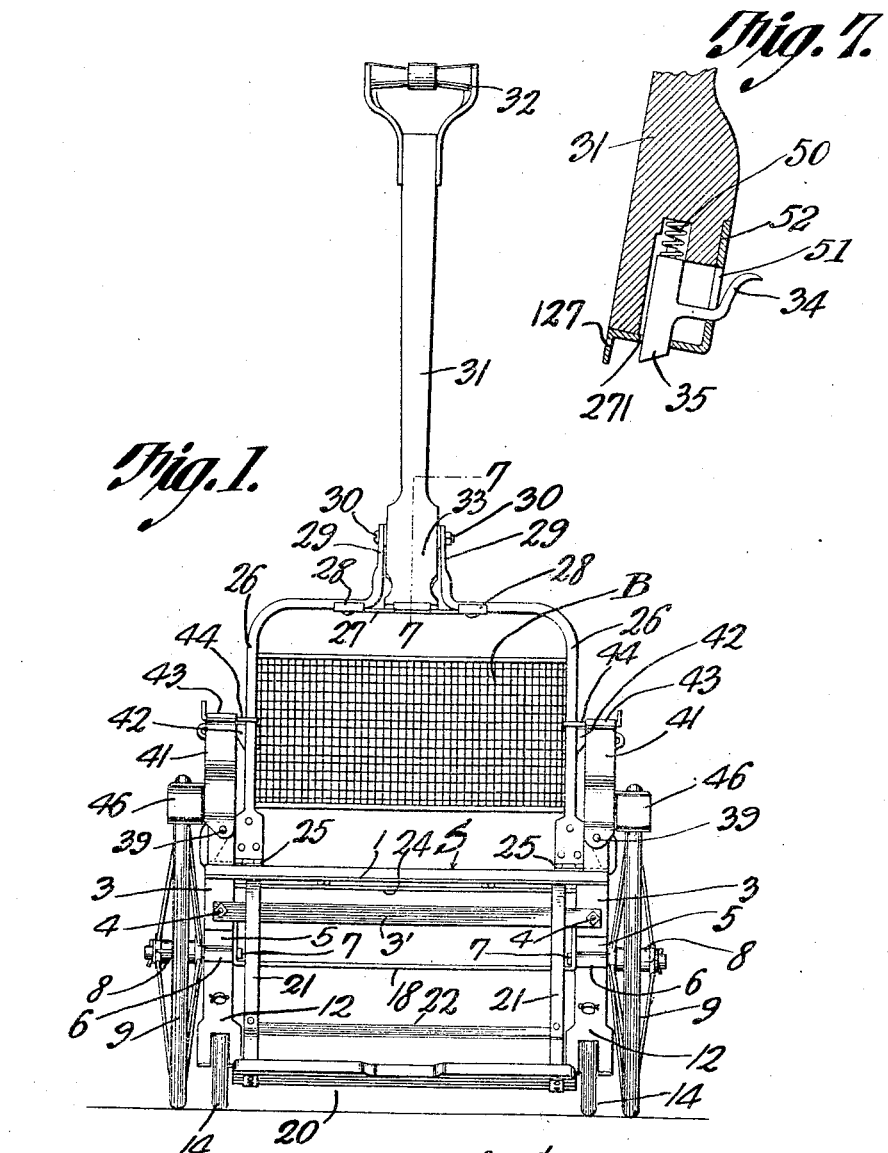

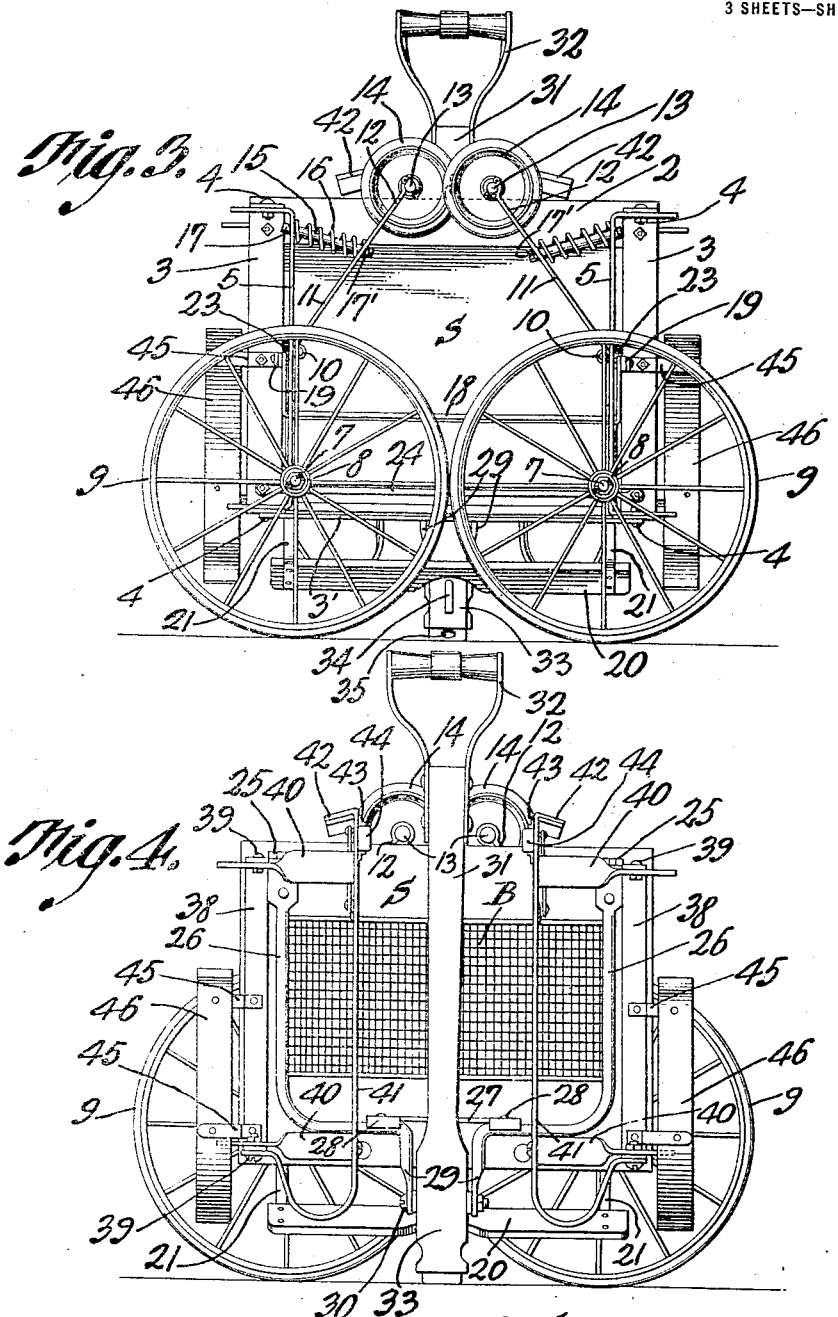

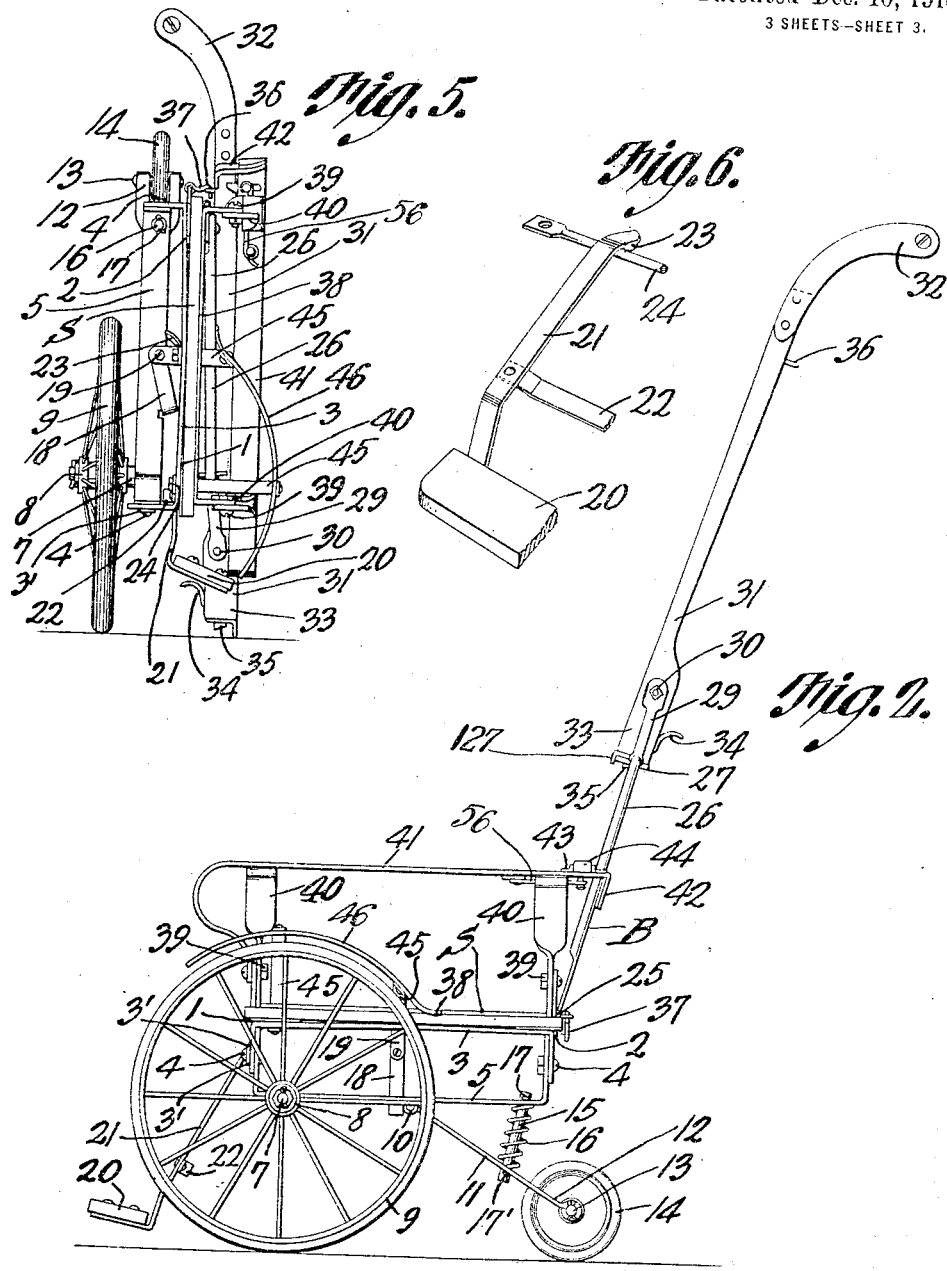

ARCHIE C. BOTSFORD, OF POMONA, CALIFORNIA.

FOLDING GO-CART.

1,287,200.  Specification of Letters Patent.  Patented Dec. 10, 1918.

Application filed October 23, 1917. Serial No. 198,112.

*To all whom it may concern:*

Be it known that I, ARCHIE C. BOTSFORD, a citizen of the United States, residing at Pomona, in the county of Los Angeles and State of California, have invented a new and useful Folding Go-Cart, of which the following is a specification.

The device forming the subject matter of this application is a go-cart, and the invention aims to provide a vehicle of this kind which can be folded up readily, so as to be carried about, the structure, however, being rigid when extended and in a condition for use.

It is within the province of the disclosure to improve generally and to enhance the utility of devices of that type to which the present invention appertains.

With the above and other objects in view which will appear as the description proceeds the invention resides in the combination and arrangement of parts and in the details of construction hereinafter described and claimed it being understood that changes in the precise embodiment of the invention herein disclosed can be made within the scope of what is claimed without departing from the spirit of the invention.

In the accompanying drawings:—

Figure 1 shows in front elevation, a go-cart embodying the present improvements, the vehicle being extended for use;

Fig. 2 is a side elevation of the go-cart;

Fig. 3 is a bottom plan, wherein the go-cart is shown folded;

Fig. 4 is a top plan wherein the go-cart is shown folded;

Fig. 5 is an elevation showing the go-cart in folded condition;

Fig. 6 is a fragmental perspective showing a portion of the foot rest and attendant parts; and Fig. 7 is a sectional view taken approximately on the line 7—7 of Fig. 1.

The go-cart forming the subject matter of this application includes a seat S. A plate 1 extends transversely of the seat S adjacent the forward edge of the seat, and is secured to the seat. A plate 2 extends transversely of the seat S, near to the rear edge of the seat, and is secured to the seat. Strips 3 extend longitudinally of the seat S, near to the sides thereof and are attached to the plates 1 and 2, the strips 3 having depending ends carrying pivot bolts 4, the front pivot bolts being connected to the ends of a brace 3' acting as a reinforcement for the depending forward ends of the strips 3. Bail shaped side members 5 are mounted on the pivot bolts 4 for inward swinging movement. The side members 5 are provided with bearings 6 receiving stub axles 7 on which are journaled the hubs 8 of main wheels 9. Rearwardly and downwardly inclined arms 11 are pivoted at 10 to the bail shaped side members 5, the rear ends of the arms being forked as shown at 12 to receive shafts 14 on which are journaled small rear wheels 14. Rods 15 are slidable in the side members 5 and in the arms 11, the rods being held in place by means of cotter pins 17 coacting with the side members 5, and by means of cotter pins 17' coöperating with the arms 11. Compression springs 16 surround the rods 15 and bear against the side members 5 and against the arms 11. The construction is such that the wheels 14 are resiliently mounted, so as to afford a cushion support for the seat S adjacent the rear end thereof. Hangers 19 are fixed to the seat S and depend therefrom. A bail shaped retainer 18 is pivoted to the hangers 19 and operates between the side members. The numeral 20 denotes a foot rest carried by rearwardly and upwardly extended supports 21 spaced by a brace 22. The upper ends of the supports 21 are received above a keeper rod 24 attached at its ends to the seat S, the supports 21 having projections 23 at their rear ends, to coöperate with the keeper rod 24 when the foot rest 20 is in an extended position, as shown in Fig. 2.

When the vehicle is in use, as shown in Fig. 2, the side members 5 are in depending positions, and are held against folding inwardly, by contact with the ends of the depending retainer 18. The foot rest 20 is in the lowered position on Fig. 2, the projections 23 on the supports 21 engaging behind the rod 24, as shown in Fig. 6. When the go-cart is to be folded, the foot rest 20 is raised, the supports 21 sliding rearwardly across the bar 24 until the brace 22 engages the bar. The retainer 18 is swung into a position parallel with the seat S, and then the side members 5, together with the wheels 9 and 14, may be swung inwardly, until the wheels are parallel to the seat S.

Resuming the description of the structure, it may be stated that the vehicle includes a back comprising approximately L- shaped rods 26 connected by a rest or back proper B. The upper, parallel ends of the rods 26 are denoted by the reference numeral 29, the lower ends of the rods 26 being hinged as shown at 25 to the seat S. A bridge strip 27 is connected at its ends, as shown at 28, with the transverse portions of the rods 26, to hold the ends 29 of the rods spaced. Mounted in the ends 29 of the rods 26 is a pivot pin 30 on which a handle 31 is mounted to swing, the lower end of the handle being denoted by the reference numeral 33, and a grip 32 being carried by the upper end of the handle. A casing 52 is secured to the lower end 33 of the handle 31 and has a depending lip 127. The casing 52 is provided with a lower opening 271 and with a rear opening 51. A latch 35 slides in the opening 271 of the casing 52 and is provided with a rearwardly extended finger piece 34 adapted to move in the opening 51, the latch being advanced by a compression spring 50 seated in a recess in the end 33 of the handle 31. There is an eye 36 on the handle 31, and the rear edge of the seat S is provided with a hook 37 adapted to engage the eye.

When the cart is in use as shown in Fig. 1, the bridge strip 27 is engaged by the lip 127, the latch 35 engaging the bridge strip. In this way, the handle 31 is held rigidly in alinement with the back, comprising the rods 26. The latch 35 may be disengaged by means of the handle piece 34 from the bridge strip 27. Then the back, comprising the rods 26 may be folded forwardly on the seat S, the back swinging on the hinges 25, and the handle 31 being folded rearwardly to lie above the back, the handle tilting on the pivot pin 31. When the back and the handle are folded as described, the hook 37 is engaged with the eye 36, as shown in Fig. 5, and the vehicle may be carried about by means of the grip 32.

Plates 38 are attached to the seat S adjacent the sides thereof, the plates having upstanding ends carrying pivot bolts 39 on which are mounted supports 40 carrying arms 41 having transverse projections 42. When the vehicle is in use, as shown in Fig. 2, the projections 42 on the arms 41 engage behind the rods 26 of the back and prevent the same from swinging rearwardly. When the back has been folded forwardly onto the seat S, and when the handle 31 has been folded rearwardly onto the back, as above described, the arms 41 may be folded inwardly above the seat S and above the back and the arms, the supports 40 tilting on the pivot bolts 39. When the arms 41 are turned up, and in use, as shown in Fig. 2, the lower ends of the supports 40 engage the outer edges of the plates 38, and thus the arms 41 are prevented from swinging outwardly to an undesirable extent.

A means is provided whereby the back, including the rods 26, may be prevented from swinging forwardly, when the structure is set up as shown in Fig. 2. With this end in view, guides 43 are mounted on the arms 41, latches 44 being mounted to slide in the guides, the latches being moved inwardly by means of springs 56 carried by the arms. The latches 44 engage in front of the rods 26 and prevent the back and the handle 31 from swinging forwardly when the parts are arranged as shown in Fig. 2. The latches 44, however, can be retracted to permit the back to be swung forwardly upon the seat S, on the hinges 25, as hereinbefore mentioned.

The operation of the structure has been dealt with hereinbefore, step by step, in connection with the various component mechanisms, but a brief résumé may be given at this point.

In order to collapse the cart, the retainer 18 is swung upwardly, out of engagement with the side members 5, the side members being swung inwardly, beneath the seat S on the pivot bolts 4. This operation disposes the wheels 9 and 14 parallel to the seat S. The back, including the rods 26, is swung forwardly on the hinges 25, the handle 31 is swung rearwardly on the pivot pin 30, the hook 37 is engaged with the eye 36, and the arms 41 are swung inwardly, on the pivot bolts 39. The structure thus is disposed in the compact form shown in Figs. 3, 4 and 5, and may be carried about readily by means of the grip 32.

It will be understood that all pivot bolts, of which the elements 39 may be taken as typical, may be tightened up to any desired extent, so that the parts which are united by the pivot bolts may move with some friction on each other.

Having thus described the invention, what is claimed is:—

1. A device of the class described including a seat; side members pivoted to the seat; wheels carried by the side members, the side members being foldable to dispose the wheels in parallelism to the seat; a back hinged to the seat and foldable to overlie the seat; a handle carried by the upper end of the back and arms pivoted to the seat, the arms being foldable to overlie the back, the arms and the back being provided with interengageable elements, independent of the handle, limiting the rearward swinging movement of the back.

2. A device of the class described including a seat; side members pivoted to the seat; wheels carried by the side members, the side members being foldable to dispose the wheels in approximate parallelism to the seat; a back hinged to the seat and foldable to overlie the seat; a handle pivoted to the back and foldable to overlie the back, the handle being narrower than the back; releasable means for holding the handle in approximate alinement with the back; and arms pivoted to the seat, the arms being foldable to overlie the back on each side of the handle.

3. A device of the class described comprising a seat; side members pivoted to the seat; wheels carried by the side members, the side members being foldable to dispose the wheels in approximate parallelism to the seat; a back hinged to the seat and foldable to overlie the seat; a handle pivoted to the back and foldable to overlie the back; releasable means for holding the handle in approximate alinement with the back; arms pivoted to the seat and foldable to overlie the back, the arms being provided with means for engaging the back, to limit the rearward swinging movement thereof; and latches carried by the arms, the latches coacting with the back to limit the forward swinging movement thereof.

In testimony that I claim the foregoing as my own, I have hereto affixed my signature in the presence of two witnesses.

ARCHIE C. BOTSFORD.

Witnesses:
LEWIS HENRY NOLAN,
HERBERT WARREN BARNUM.